June 14, 1927. S. A. XIPPAS Re. 16,656

VENTILATING FAN

Original Filed Nov. 9, 1925 2 Sheets-Sheet 1

Inventor
Socrates A. Xippas

By Frank J. Barrett
Attorney

June 14, 1927. Re. 16,656

S. A. XIPPAS

VENTILATING FAN

Original Filed Nov. 9, 1925 2 Sheets-Sheet 2

Inventor
Socrates A Xippas.
Ralph J. Barrett
Attorney

Reissued June 14, 1927. Re. 16,656

UNITED STATES PATENT OFFICE.

SOCRATES ANTHONY XIPPAS, OF PITTSBURGH, PENNSYLVANIA.

VENTILATING FAN.

Original No. 1,577,280, dated March 16, 1926, Serial No. 67,737, filed November 9, 1925. Application for reissue filed April 23, 1927. Serial No. 186,132.

This invention relates to electric fans, and one object of my invention is to provide a vertical electric fan, which is neat in appearance and durable in construction, and one which will effectively distribute and keep in circulation the air of a room.

Another object of my invention is to provide an electric fan which will properly distribute the air in a room, thus maintaining an even temperature in a room at all times, and at the same time preventing a strong blast of air being delivered in any direction.

Another object of my invention is to provide such an electric fan in which the air from the upper and lower parts of the room, where the extreme temperatures prevail, are drawn into the fan and discharged through the medial horizontal zone of the fan, thus maintaining the entire air contents of the room at an even temperature.

Another object of my invention is to provide such an electric fan as will maintain correct ventilation in the breathing space of a room, that is, that space which is between a person's head while standing, and a person's head while sitting.

Another object of my invention is to provide such an electric fan with an air cooled motor, the air while being drawn into the fan casing, providing the means for cooling the motor.

Still another object of my invention is to provide such a fan that is noiseless in operation, and in which there is no gushing or violent blowing of air.

I accomplished the above and other objects of the invention which will be apparent as the description proceeds, by means of the device shown in the accompanying drawings, in which.

Figure 1:
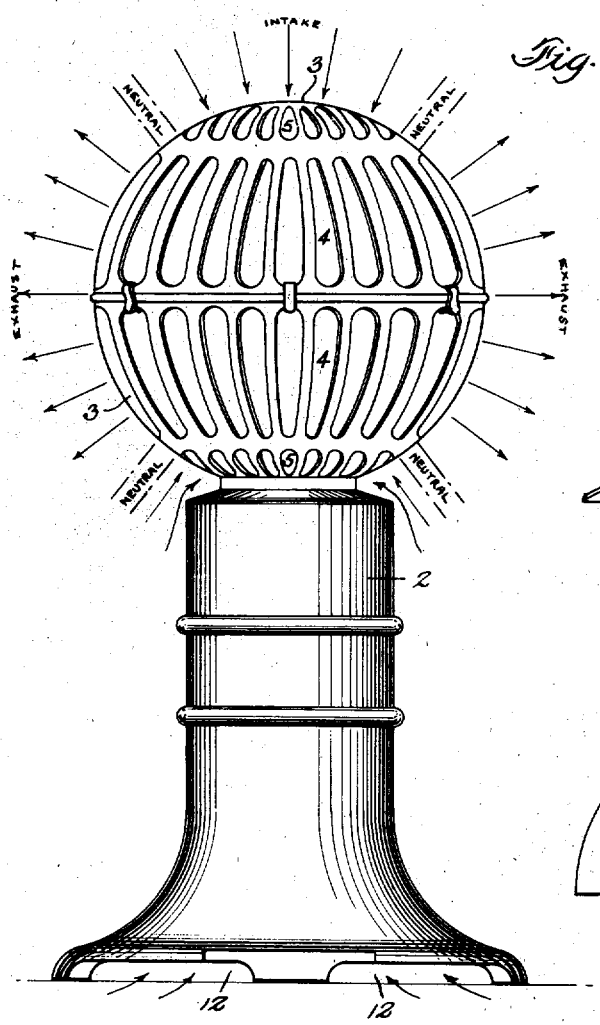
Fig. 1 is a perspective of the device.

In the drawings, in which like reference characters indicate like parts on all the figures thereof, 1 indicates the fan casing and 2 the motor casing, which also serves as the supporting stand for the fan casing and enclosed elements. The fan casing is formed of two hemispherical parts 3, 3, each of which is provided with two series of openings. One series of openings 4, 4 are arranged in the medial zone of the casing and the other series of openings 5, 5 are arranged in the polar zones of the casing. The openings 4, 4 are of elongated form and extend for a greater vertical distance than the openings 5, 5, the purpose of which will be apparent as the description proceeds.

Within the casing 1, is the rotary impeller or fan proper, which comprises the blades 6, each of which is substantially the shape of the quadrant of a circle. A plate 7 is provided with four arms 8, substantially at right angles to each other, each arm having a flange 9 at one edge thereof to which is attached a fan blade, two of the blades being disposed above the plate 7, and two below.

The opposed edges of the two upper blades are connected at their peripheral portions by means of an adjustable band comprising two strap elements 10, 10 having slotted ends through which is passed a set screw 11. The opposed edges of the two lower blades are similarly connected. This adjustable strap connection permits of the blades being set at the desired angle with reference to the plate 7, and strengthens the structure thus preventing the parts being bent out of position during the continued operation of the fan.

The motor casing 2 has cut out portions 12 at the bottom thereof, forming entrance ports for the admission of air.

The blades may be set at any desired angle depending upon the velocity with which the fan is to be operated. As examples of the relative pitch of the blades, and the relative velocity of operation required to admit and discharge the same amount of air within a given period of time, the following table is given which sets forth the actual results during tests:—

1. Discharge from fan per minute in cubic feet, at 1300 R. P. M.=1120, pitch of blades 85°.

| 2. Pitch of blades. | Velocity. |
|---|---|
| 55° | 383 |
| 65° | 584 |
| 75° | 735 |
| 80° | 742 |
| 85° | 748 |
| 90° | 707 |

An efficiency curve A is shown in Figure 7 which charts the above results, the abscissas representing the pitch of the blades and the ordinates the velocity of operation.

The area of the openings in the medial zone is such that the amount of air drawn into the casing during the operation of the fan will be discharged over a large surface. and in such a way that no violent blast will be produced, but merely a gentle breeze with a continual circulation of the surrounding air.

Figure 2:
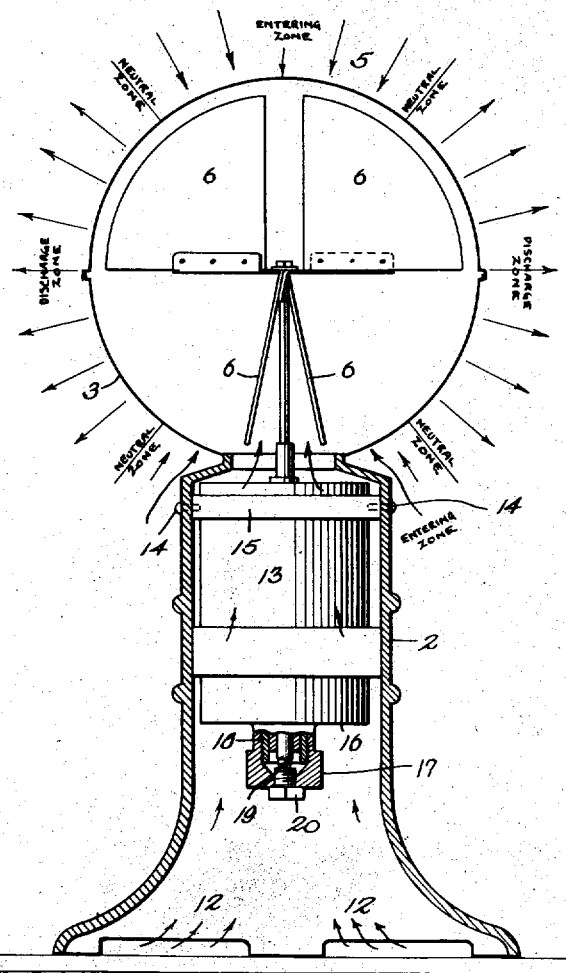
Fig. 2 is a vertical central section of the device.
Figure 6:
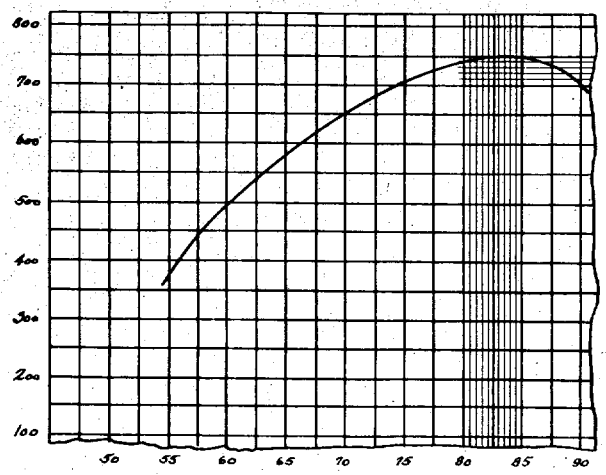
Fig. 6 is a chart illustrating the efficiency values of the blades of the rotary impeller at different angles.

As will be apparent by following the paths of the arrows on Fig. 2 of the drawings, air entering the entrance ports 12 in the motor casing, is drawn upwardly around the motor, thus cooling the motor Air is also drawn into the fan casing directly from the room through openings surrounding the connections between the fan and motor casings. These two currents of air are drawn along and follow the surface of the lower fan blades.

The air surrounding the upper part of the fan casing is drawn into the casing between the upper blades until it meets and becomes commingled with the two currents entering the lower portion of the casing. Since the air entering the upper portion of the casing is of a different temperature from that entering the lower portion of the casing, this commingled action of the fan is of considerable importance, since it serves to equalize the temperature of the air in the room. It is also to be noted that the air entering the lower portion of the fan casing directly from the room will be of a different temperature from that entering it from the motor casing. There are, therefore, three different stratas of air at different temperatures which meet and are commingled in the fan casing.

The continuous movement of the fan blades then forces the thoroughly commingled air of medium temperature outwardly along the fan blades and discharges it from the peripheries thereof in a tangential direction, through the openings in the medial zone of the casing.

It will be noted that the air will be drawn into the casing in the angular space between the blades, and be expelled from the periphery of the blades so that there is no tendency for the outgoing air to force the incoming air from its path as it enters the casing.

Figure 3:
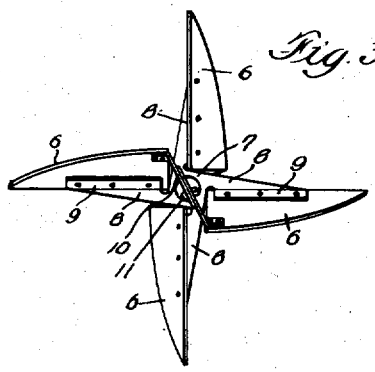
Fig. 3 is a top plan view of the rotary impeller.
Figure 4:
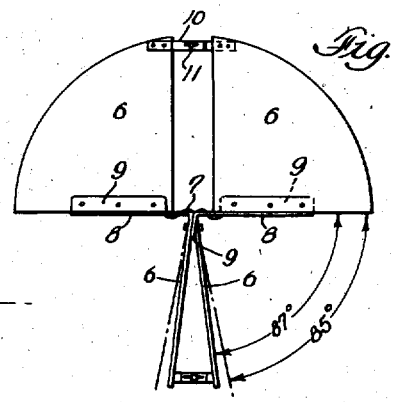
Fig. 4 is a front view of the rotary impeller.
Figure 5:
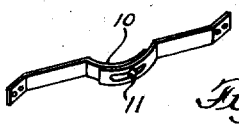
Fig. 5 is a perspective detail view.

From Figs. 2, 3 and 4 of the drawings, it may be seen that the blades 6 in rotating in a counter clock-wise direction, will push or force the air currents from the top and bottom of the fan proper toward the plate 7, and the root portions of the blades will then deflect the intermingled air currents and gently move the same by centrifugal force, tangentially through the discharge zone of the fan casing.

Between the medial zone and the two polar zones, there are neutral zones, that is, when the air which has been drawn into the casing reaches these zones, there is no tendency for it to continue on its upward or downward path, and it is therefore retarded in its movement. This retarding action takes place just before the continued movement of the fan blades forces it out through the openings 4 of the casing.

The motor 13 is supported in the motor casing 2 by means of screws 14, which are screwed into lugs projecting from the band 15 surround the upper portion of the motor step bearing 16 at the lower portion thereof. The step bearing 16 comprises a nut 17 having screw threaded connection with the yoke 18, the nut being provided with a recess in which is located a steel ball 19, the position of the ball with respect to the recess, being determined by the adjustment of the nut 20.

The driving connection between the motor and the fan blade supporting plate 7 comprises a vertical shaft 21 which passes through a central opening in the blade, and is maintained in place by the lock nut 22.

What I claim and desire to secure by Letters Patent is:

1. In a device of the class described, a rotary impeller, and an enclosing casing therefor, said casing having a medial zone and two polar zones of openings therein, said impeller including means whereby the air is drawn into said casing through the openings in the polar zones and forced toward the medial zone, said means serving to discharge the air through the openings in the medial zone.

2. In a device of the class described, a rotary impeller, a spherical enclosing casing therefor, said casing having a medial zone of longitudinally extending openings therein for the discharge of air, and two polar zones of longitudinal openings for the admission of air, the area of the openings in the medial zone being relatively greater than the area of the openings in the polar zone whereby the air will be discharged over a large area with reduced force.

3. In a device of the class described, a spherical casing, said casing having two polar zones provided with openings for the admission of air, said casing being also provided with a medial zone of openings for the discharge of air, and a rotary impeller located within said casing, said impeller comprising a plurality of blades consisting of sets of upper and lower blades, said blades being disposed at substantially right angles to each other, and in planes at an angle to the central vertical plane passing through the casing.

4. In a rotary impeller, a rotatably mounted support, a series of horizontal arms on said support, substantially at right angles to each other, an inclined blade attached to each arm, some of the blades extending upwardly and other of the blades extending downwardly, and the pitch of the blades being between 55° and 90° relatively to said arms.

5. In a rotary impeller, a rotatably mounted support, a series of horizontal arms on said support at angles to each other, upwardly extending blades attached to certain of said arms, downwardly extending blades attached to other of said arms, the pitch of each blade being substantially 85° relatively to said arms.

6. In a rotary impeller, a rotatably mounted support, a series of horizontal arms on said support at right angles at each other, an inclined blade on each arm, and means for joining diametrically opposed blades to each other near their outer edges.

7. In a device of the class described, a rotary impeller, an enclosing casing therefor, said casing having a medial zone and two polar zones of openings therein, said impeller comprising a rotatably mounted support, separate upper and lower blades on said support, all of said blades being inclined to the vertical.

8. In a device of the class described, a rotary impeller, an enclosing casing therefor, said casing having two polar zones of openings therein for the admission of air, and a medial zone of openings for the discharge of air, said impeller comprising a rotatably mounted support, horizontal arms on said support, upper blades attached to certain of said arms, and lower blades attached to other of said arms, said blades being at right angles to each other, and all of said blades being inclined to the vertical.

9. In a device of the class described, a rotary impeller, an enclosing casing therefor, provided with top and bottom air admission ports and with intermediate exhaust ports, a motor for operating said impeller, a casing for said motor, said first named casing being supported upon said second named casing, said second named casing having an air entrance port in the lower portion thereof, and being in communication with the first named casing at the top of the motor casing, and said impeller having blades arranged to force streams of air from the ends of the impeller toward the medial portion of the same, to intermingle said streams and to discharge the same through said exhaust ports.

10. In a device of the class described, a rotary impeller, a casing therefor, said casing having air inlet ports in the upper and lower portions thereof, and air exit ports in the medial portions thereof, said impeller including means whereby the air admitted through the upper and lower ports will be commingled and discharged through the exit ports.

11. In a device of the class described, a rotary impeller, a casing therefor, a hollow support for said casing, means for admitting air into the support, means for admitting air into the upper and lower portions of the casing, and means for admitting air into the casing from the support, said impeller including means whereby the air admitted into the casing will be commingled and discharged through the medial portion of the casing.

12. In a device of the class described, a rotary impeller, a casing therefor, means for admitting air into said casing at opposite points, means for discharging air from said casing at intermediate points, said impeller comprising a plurality of blades arranged to force streams of air from the air admitting means toward the intermediate portion of the impeller, to intermingle said streams and to discharge the same through the discharging means.

13. In a device of the class described, a rotary impeller, an openwork casing therefor, said impeller comprising a plurality of upper blades at an angle to each other, a plurality of lower blades at an angle to each other, all of said blades being inclined relatively to the vertical, said blades being arranged to draw air into the casing at points in the angles between the blades, to force said air toward the intermediate portion of the impeller and to discharge the same along the periphery of the blades.

14. In a device of the class described, a rotary shaft, and an impeller on said shaft comprising blades having portions adapted to force air axially from the ends of the impeller toward the medial portion of the same, the portions of the blades at the medial part of the impeller being shaped to mix the air from the opposite ends of the impeller, and to force the air away from said shaft.

15. In a device of the class described, a vertical rotary shaft, and an impeller mounted on and rotatable with said shaft, said impeller comprising axially extending oppositely projecting blades having portions adapted to force air from the ends of the blades, toward the medial portion of the impeller, the portions of the blades at the medial part of the impeller being shaped to mix the air from the ends of the blades, and to discharge the same horizontally under centrifugal force.

SOCRATES ANTHONY XIPPAS.